Patented Oct. 25, 1932

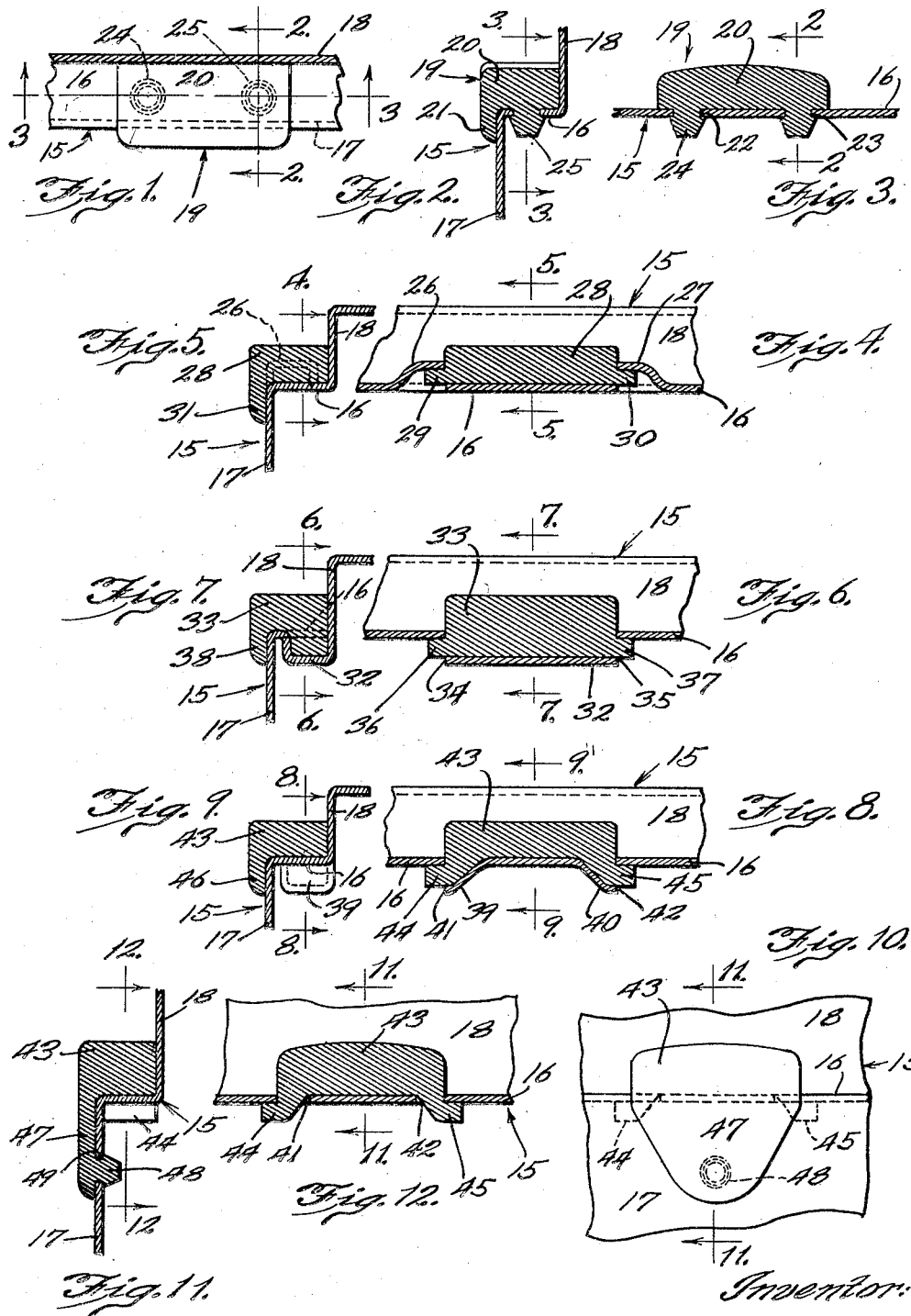

1,884,830

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Original application filed April 2, 1931, Serial No. 527,129. Divided and this application filed September 16, 1931. Serial No. 563,057.

This invention has to do with certain new and useful improvements in door bumpers and the like. The door bumper constructions herein disclosed are especially intended for use in connection with the doors of automobile bodies and the like, although it will appear that said features may also be used to advantage in connection with other constructions. Inasmuch, however, as said features have been devised especially with a view to meeting the requirements of automobile doors, I have illustrated and will particularly describe such uses and applications of the invention, but in so doing I wish it clearly understood that I do not thereby intend to limit myself except as I may do so in the claims.

In the construction of automobile bodies it is customary to provide a door frame member or element against or towards which the edge portion of the door moves during the door closing operation. Usually this element is in the form of what is known as a door pillar. The door pillar is generally so formed as to provide a ledge facing in the direction of door closing movement and also to provide inwardly extending flanges lying parallel to the direction of door closing movement. Generally said pillar is also provided with an outwardly extending flange which also lies parallel to the direction of door closing movement.

The companion edge portion of the door is so formed as to provide companion ledges and flange surfaces; the ledge of the door approaching directly towards the ledge of the door pillar, and the flanges of the door moving parallel to or wiping close to the flanges of the door pillar.

It is usually customary to provide one or more bumper blocks on the door pillar in position to receive the forces of pressure and impact incident to the door closing operation. Generally these bumper blocks on the door pillar are provided with head portions which are supported by the door pillar or some element thereon and the ledge of the door strikes or presses against the head portion of the bumper block when the door is closed. The bumper block is also usually provided with a lip or skirt portion which overlies the inwardly extending flange at the position of the bumper block and establishes a wiping contact surface against which the companion flange surface of the door wipes during the door closing movement.

The main object of the present invention is to provide a new and improved means for securing the bumper block in place on the door pillar. This securing means is so constituted that the bumper block is held in place without the need of using any extraneous connecting devices; the attaching operation being performed by providing the door pillar and the bumper block with companion openings and lugs which interlock with each other to retain the bumper block in place.

More particularly it is an object of the present invention to provide companion interlocking openings and lugs on the ledge of the door pillar and on the head portion of the bumper block. In this connection it is a further object of the invention to so arrange the openings of the door pillar ledge that the ledge is provided with a relatively large and ample direct supporting surface for the head of the bumper block so that the latter will have an ample support to resist the pressures and shocks incident to the door closing operation.

It is a further object of the invention to so relate the parts so that the bumper block can be set into and secured in place by the simple expedient of bending or deflecting it to enable the lugs thereof to be introduced into the openings of the door pillar, thus eliminating other extraneous connecting devices.

In some cases it is also an object to provide similar cooperating openings and lugs on the pillar and on the bumper block for securing the lip or skirt of the bumper block more permanently in place.

Other objects and uses of the invention will appear from a detailed description of the same which consists in the features of construction and combinations of parts hereinafter described and claimed.

This application is a division of my copending application for Letters Patent on improvements in door stops and the like, Serial No. 527,129, filed April 2, 1921.

In the drawing

Figure 1 shows a fragmentary plan view of a short section of a door pillar having applied thereto a door stop embodying the features of the present invention;

Figure 2 shows a cross section on the lines 2—2 of Figures 1 and 3 looking in the direction of the arrows;

Figure 3 shows a longitudinal section on the lines 3—3 of Figures 1 and 2 looking in the direction of the arrows;

Figure 4 shows a view similar to that of Figure 3 but illustrating a modified form of construction and may also be considered as a longitudinal section on the line 4—4 of Figure 5 looking in the direction of the arrows;

Figure 5 shows a cross section on the line 5—5 of Figure 4 looking in the direction of the arrows;

Figures 6 and 7 show views similar to Figures 4 and 5 but illustrating another modified form of construction;

Figures 8 and 9 show views similar to Figures 4 and 5 but illustrating another modified form of construction;

Figure 10 shows a fragmentary face view of a short section of door pillar having applied thereto still another modified form of bumper block construction;

Figure 11 shows a cross section on the lines 11—11 of Figures 10 and 12 looking in the direction of the arrows; and Figure 12 shows a longitudinal section on the line 12—12 of Figure 11 looking in the direction of the arrows.

The constructions disclosed in Figs. 4, 5, and 8 to 12 form the subject matter of a separate divisional application, Serial No. 563,055, filed September 16, 1931, and the construction disclosed in Figs. 6 and 7 forms the subject matter of another separate divisional application, Serial No. 563,058, filed September 16, 1931. This application is therefore confined to the disclosure of Figs. 1 to 3.

In each of the constructions herein described and illustrated the door pillar is designated in its entirety by the numeral 15. It includes the ledge 16 which faces in the direction of door closing movement; and in each instance the door pillar is also provided with the inwardly and outwardly extending flanges 17 and 18 respectively which lie parallel to the direction of door closing movement.

In the construction of Figure 1 the bumper block 19 is provided with a head portion 20 which rests directly upon and is supported by the door pillar ledge 16. Said bumper block is also provided with a skirt or lip portion 21 which slightly overlies the face portion of the inwardly extending flange 17 at the position of the bumper block.

In the construction illustrated the ledge 16 of the door pillar is provided with a pair of perforations or openings 22 or 23 in line with each other but separated a substantial distance lengthwise of the door pillar. The body portion 20 of the block is provided with the buttons or head lugs 24 and 25 which can be forced through the openings 22 and 23 and which buttons or lugs are provided with undercut grooves immediately beneath the head portion 20 as clearly indicated in Figures 2 and 3. As a consequence this bumper block can be forced into place, the lugs 24 and 25 snapping or buttoning through the openings of the door pillar ledge.

It will be noted that when this door bumper is in place it is afforded a very large surface of direct support for the head portion of the bumper block, the openings through which the lugs or buttons are forced being relatively small.

Preferably also the top or exposed surface of the head of the bumper block is crowned or arched as best shown in Figure 3 so that the point of initial contact against the bumper block is directly between the door pillar openings. As a consequence there is assurance that the initial and maximum pressure on the bumper block will take place at a point where there is afforded a maximum degree of direct support for the bumper block head.

Referring next to the form shown in Figures 4 and 5, in this case the ledge 16 of the door pillar is so treated as to provide the upwardly struck lugs or ears 26 and 27 facing each other and establishing a pair of oppositely facing openings in the material of the ledge and above the surface of the ledge. The ledge material between said openings is uncut and not deformed between the openings.

In the present case the head portion 28 of the bumper block rests directly upon the ledge between said openings; and the end portions of the body of the head of the bumper block are provided with lugs 29 and 30 which can be forced down through the openings in the ledge of the door pillar so as to lock the same in place. In the present case also the bumper block is provided with a lip or skirt 31 which overlies the edge portion of the flange 17 of the door pillar.

In the construction of Figures 6 and 7 the ledge portion of the door pillar is so treated as to provide the downwardly depressed longitudinally extending seat 32 for directly supporting the head portion 33 of the bumper block, openings 34 and 35 being formed in the ends of said ledge portion 32, said openings 34 and 35 facing in opposite directions and beneath the position of the door pillar ledge 16.

In the present case the body portion of the bumper block is provided with the end lugs 36 and 37 which can be forced through said openings to lock the bumper block in place. In the present case also the bumper block is provided with a lip or skirt 38 which overlies the edge portion of the flange 17.

In the construction of Figures 8 and 9 the ledge portion 16 is so treated as to provide the downwardly extending lugs or ears 39 and 40 which reach to positions below the ledge 16 and face in opposite directions away from each other, openings 41 and 42 being thus established in the ledge at the position of said lugs or ears 39 and 40. In the present case the material of the ledge 16 between said lugs or ears is untreated and lies substantially in alignment with the remaining portions of said ledge.

In the present case the body portion 43 of the bumper block is provided with the downwardly and endwise projecting lugs 44 and 45 which extend through the openings 41 and 42 so as to lock the bumper block in place on the ledge. Furthermore these downwardly and endwise extending lugs 44 and 45 find direct support on the ears 39 and 40 so that the head portion of the bumper block is directly supported throughout its entire length.

In the present case also the bumper block is provided with the downwardly extending lip or skirt 46 which slightly overlies the flange 17 of the door pillar.

The construction shown in Figures 10, 11, and 12 is similar to that of Figures 8 and 9, but in the present case the lugs or ears 39 and 40 are eliminated and the lugs 44 and 45 on the bumper block are not afforded support thereby.

In the present case also the lip or skirt 47 is carried down a substantial distance over the face of the inwardly extending flange 17; and there is provided an undercut lug or button 48 which is forced through an opening 49 of the flange 17 so as to lock the lip or skirt thereto.

While I have herein shown and described only certain embodiments of the features of my invention still I do not intend to limit myself thereto except as I may do so in the claims.

I claim:

1. A door buffer device comprising a pillar member having an impact ledge facing in the direction of door closing movement, and inwardly and outwardly extending side flanges substantially parallel with the direction of door closing movement, a bumper block extending across said ledge in abutment with the outwardly extending flange, said block having an elongated lip on one of its longitudinal edges arranged to overlie the side of the inwardly extending flange, said impact ledge having a pair of openings provided therein adjacent the opposite ends of said block, and fastening lugs provided on the back of the bumper block and fitting in said openings so as to anchor the block in place on the ledge.

2. A device as set forth in claim 1 wherein the door contacting face of the bumper block is formed arcuate lengthwise of the block with the highest portion at the middle and between the points of fastening substantially as and for the purpose described.

3. A door buffer device comprising a pillar member having an impact ledge facing in the direction of door closing movement, and an inwardly extending side flange substantially parallel with the direction of door closing movement, a bumper block extending across said ledge, said block having an elongated lip on one of its longitudinal edges arranged to overlie the side of the inwardly extending flange to assume side thrust and hold the block in position with respect to the ledge, said impact ledge having an opening provided therein, and a fastening lug provided on the back of the bumper block and fitting in said opening so as to anchor the block in place on the ledge.

4. A device as set forth in claim 3 wherein the block is provided with two lugs adjacent opposite ends of the block for cooperation with a pair of openings provided in the impact ledge, and wherein the door contacting face of the bumper block is formed arcuate lengthwise of the block with the highest portion at the middle and between the points of fastening substantially as and for the purpose described.

5. A bumper for auto door pillars comprising a resilient block having angularly disposed sides, one of which is adapted to overlie the impact ledge of a door pillar, and the other of which is adapted to overlie the adjacent side wall to assume side thrust and hold the block in position with respect to the ledge, and a fastening lug provided on the back of the impact ledge portion of the block adapted to enter an opening provided in the impact ledge of the pillar.

6. A bumper for auto door pillars comprising a resilient block having angularly disposed sides, one of which is adapted to overlie the impact ledge of a door pillar, and the other of which is adapted to overlie the adjacent side wall, and fastening lugs provided on the back of the impact ledge portion adjacent opposite ends of the block adapted to enter openings provided in the impact ledge of the pillar, the impact ledge portion of said block having the impact face thereof arcuate lengthwise of the block with the highest portion at the middle thereof between the fastening lugs.

IRA D. PERRY.